Aug. 23, 1966  E. WEICHEL  3,267,655
AGRICULTURAL LOADING AND TRANSPORTING APPLIANCES
Filed Aug. 23, 1963  3 Sheets-Sheet 1
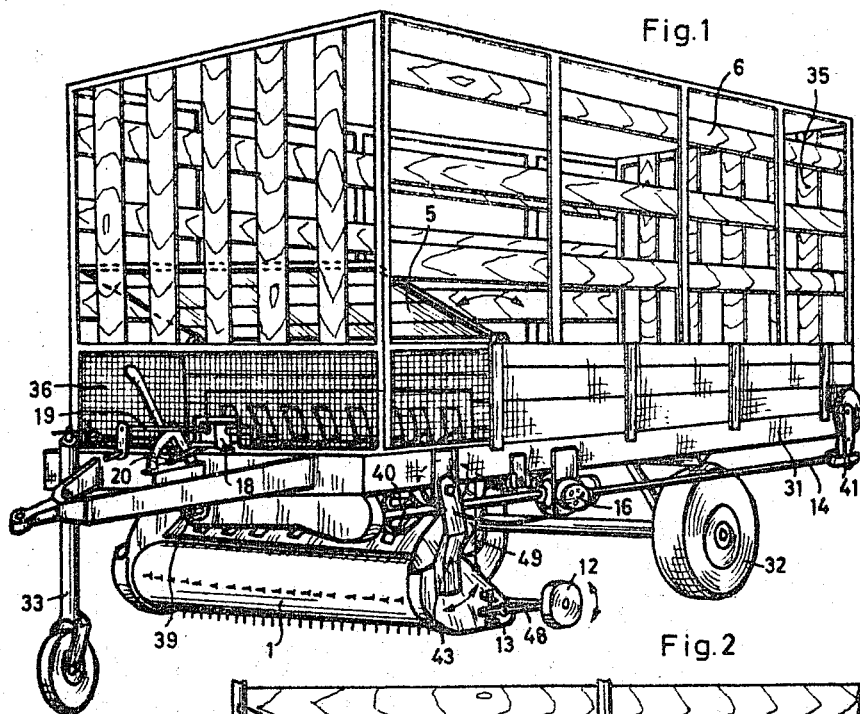
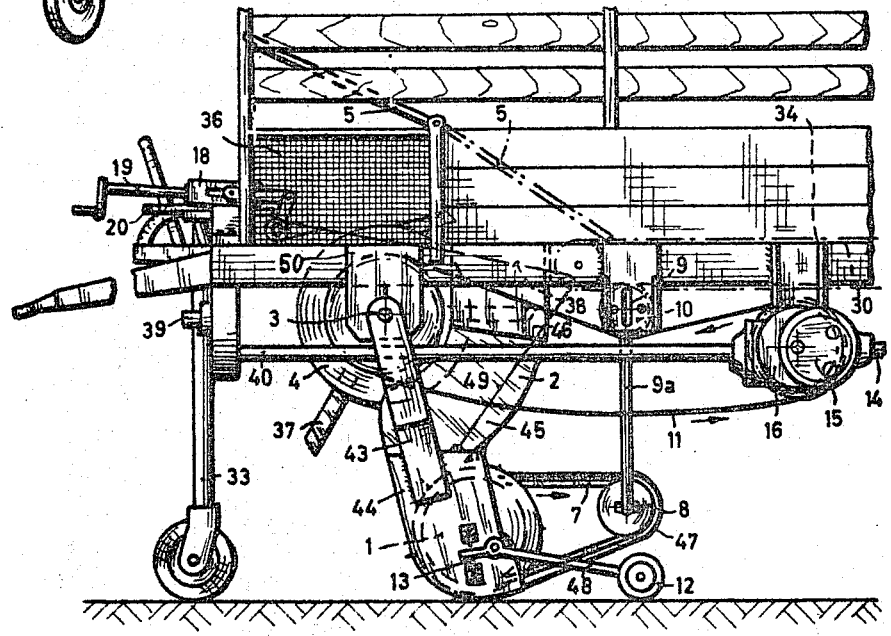
Ernst Weichel, Inventor
By Allen A. Hicks
Attorney

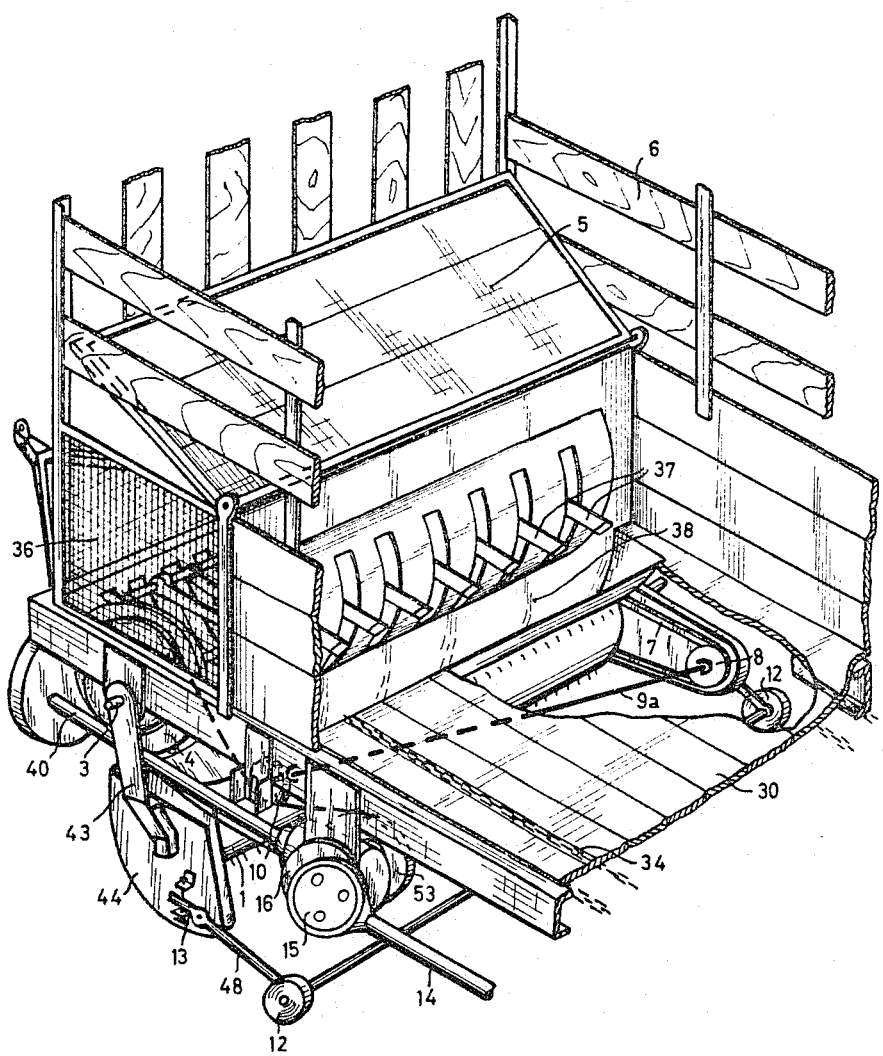

Aug. 23, 1966 E. WEICHEL 3,267,655
AGRICULTURAL LOADING AND TRANSPORTING APPLIANCES
Filed Aug. 23, 1963 3 Sheets-Sheet 3
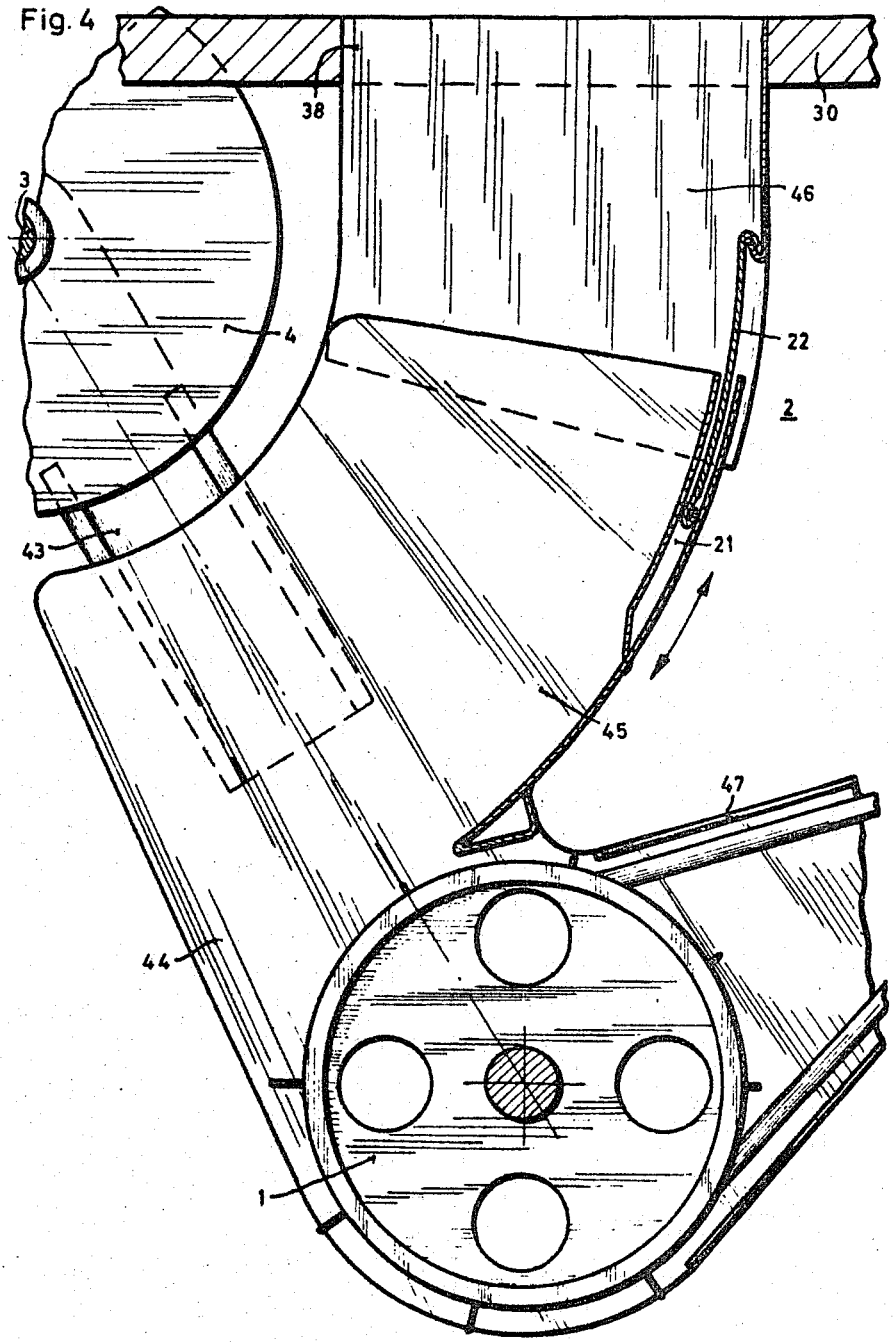
Ernst Weichel, Inventor
By Allen A. Wicke
Attorney

# United States Patent Office 3,267,655
Patented August 23, 1966

3,267,655
AGRICULTURAL LOADING AND TRANSPORTING APPLIANCES
Ernst Weichel, Goppingen, Heiningen, Germany
Filed Aug. 23, 1963, Ser. No. 303,998
14 Claims. (Cl. 56—364)

The invention relates to an agricultural loading and transporting machine with supply of the material to be charged into the loading space from below said machine by means of a pick-up drum, a conveyor duct leading from the latter to a loading platform provided with a roller or scraper floor, and conveyor elements engaging into the said conveyor duct, similar to the machine disclosed in applicant's copending application Serial No. 115,208, filed June 6, 1961, of which this application is a continuation-in-part.

In a known loading and transporting appliance of this kind the charging device is normally arranged ahead of the loading chamber in the direction of vehicle movement which results in a correspondingly large structural length or requires shortening of the loading chamber as compared with the total length of the carriage. The pick-up drum is in this case lifted off in the direction towards the conveyor drum. This is a disadvantage in that, in the operative position, the distance of the conveyor element from the pick up drum is too great and in the lifted off position both drums may lock one another.

The loading and transporting appliance according to the invention has the objects of overcoming this disadvantage and of attaining a considerable saving of space and a lowering center of gravity of the machine, which is of great importance particularly in difficult terrain because of the maneuverability and safety of the vehicle against overturning.

With these and other objects in view, which will become apparent later from this specification and the accompanying drawings, I provide an agricultural loading and transporting appliance comprising in combination: a chassis, a loading chamber mounted thereon, a loading platform having a roller floor mounted in said loading chamber, a pick-up drum, a conveyor duct leading from the latter to said loading platform from below and a conveyor drum having conveyor elements engaging in said conveyor duct, said pick-up drum and said conveyor duct being arranged below said loading chamber.

Preferably the pick-up drum with the adjacent component of the conveyor duct, which is at least partly of a circular arc shape, is pivotable about the center of said conveyor drum carrying said conveyor elements. For this purpose the conveyor duct is composed in particular of several parts engaging into one another telescope-fashion with an equalizing sheet metal piece protruding into a pocket. In this manner the pick-up drum may be adjusted at various levels in accordance with the terrain and the material to be picked up, to which the conveyor duct adapts itself appropriately at any time, and a sufficient clearance of the pick-up drum from the soil is attained in the driving position.

The guidance of the pick-up drum on the soil is preferably effected by supporting wheels arranged adjustable in height on movable outriggers.

These and other features of my said invention will be clearly understood from the following description of an embodiment thereof given by way of example with reference to the accompanying drawings, in which:

FIG. 1 is an overall perspective view of the loading and transporting appliance according to the invention;

FIG. 2 is a partial side elevation particularly of the pick-up and conveyor drums with the associated driving members;

FIG. 3 is a part view in perspective of the appliance from behind;

FIG. 4 is a section on a larger scale through the conveyor duct.

The frame 31 of the loading and transporting appliance according to the invention, which for example is constructed as a trailer, is provided with running wheels 32 and a supporting wheel 33. Alternatively the appliance could be constructed as a self propelling vehicle. The vehicle superstructure 6 encloses the loading chamber, the bottom 30 of which is occupied for the most part by a loading platform 34 constructed as a roller or scraper floor. The upper part of the superstructure 6 of the vehicle may be constructed to be detachable when the loading and transporting vehicle is for example to be used as a manure spreader. The back of the vehicle superstructure is formed by a door 35 opening outwardly.

In the foremost part of the loading chamber a compartment 36 is divided off in which the conveyor members 37 may move. The latter are for example constructed as prongs attached to a conveyor drum 4. The conveyor drum 4 turns about an axle 3 which is journalled in downwardly directed brackets 50 mounted on the vehicle chassis, and forms at the same time the axis of curvature of a conveyor duct 2 which is at least partly in the shape of a circular arc. This latter issues upwardly ahead of the loading platform 34 in an opening 38 on the bottom 30 of the loading chamber, while at the lower end of the conveyor duct 2 a pick-up drum 1 is arranged. The latter is guided on the soil by means of supporting wheels 12 journalled on outrigger arms 48. These supporting wheels 12 have a limited lock which can be adjusted by means of adjusting screws 13. The prongs 37 of the conveyor drum 4 are driven in such a manner that they pull themselves out of the material conveyed at the upper end of the conveyor duct 2.

The drive of the conveyor device is derived, by a tap shaft 39, from a main drive shaft through a chain (not shown). The latter drives a bevel gearing 16 having two driven shafts. On one of the driven shafts an eccentric 15 is mounted which moves a pull rod 14 to-and-fro. The latter effects the controllable advance of the scraper floor 34 by means of a step-by-step driving mechanism 41. The adjustment of the feed is effected by means of a hand lever 20 which is connected with the said step-by-step mechanism 41 through a rope pull (not shown).

The other driven shaft of the gearing 16 is connected with a sprocket wheel 53 through a disengageable clutch. The sprocket wheel 53 drives a chain 11 for the conveyor drum 4. For tensioning this chain a small sprocket wheel 10 is provided which is mounted on a bracket 9 and is fixed to an articulated shaft 9a. This articulated shaft runs below the vehicle box transversely thereof and drives at its other end an adjustable intermediate disc 8 which through a straight V-belt 7 drives the pick-up drum 1 in the opposite direction of the conveyor drum. In this manner a simple and reliable drive of all moving components is effected at any transmission ratio desired and in the correct direction of rotation, and any obstacles for the pick-up drum 1 (stones or the like) are overcome by the resilient V-belt 7 without any damage.

The pick-up drum 1 is journalled in bearing shields 44. For the adjustment in height and for lifting off the pick-up drum 1 these bearing shields 44 are pivotable by means of arms 43 about the axle 3 of the conveyor drum 4. The arms 43 form an integral unit with the bearing shields and with the lower part 45 of the conveyor duct. The upper part 46 of the conveyor duct on the other hand is fixedly connected with the bottom 30 of the loading chamber. While on the side walls of the conveyor duct the sheet metal pieces of the wall simply are telescoped into one another, the outer wall of the lower part 45 is constructed in the shape of a pocket at 21. Into this pocket projects a compensating sheet metal piece 22 fixed to the outer wall surface of the upper part 46. One of the bearing shields 44 is continued in a belt box 47 which covers the V-belt 7 and serves as a bearing for the adjustable intermediate disc 8. At the same time the outrigger arms 48 of the supporting wheels 12 are pivoted on the bearing shield 44.

At the upper ends of the bearing shields 44 ropes or chains 49 are attached, to which a pull may be applied, by means of a spindle 19. Thereby the pick-up drum 1 may be adjusted in height and lifted off whereby at the same time the conveyor duct is shortened and the drive of the pick-up drum may be continued. The correct relative position of the conveyor duct and the pick-up drum is accordingly not affected. The spindle 19 is rotatable in a bearing bracket 18 which may serve at the same time as a bearing for the adjustment lever 20 of the scraper floor feed.

When the superstructure 6 of the vehicle is taken off for example when using the latter as a manure spreader, the use of the loading chamber above the conveyor drum is dispensed with. The bottom of this part of the loading chamber is accordingly constructed as a pivotable flap 5. The flap 5 is in the position illustrated in FIGS. 1 and 3 for the loading operation, in which it allows the use of the loading chamber above the conveyor members, since the material to be loaded when being discharged by means of the scraper floor 34 slides off the oblique flap and can in this manner be regularly discharged. However, if the vehicle is to be used as a pure transport vehicle without taking in any material by means of the loading device (for example loading by means of a field chopping machine or used as a manure spreader), the flap is turned over to the right hand side of FIGURE 2. It then covers the loading aperture 38 in the bottom 39 of the loading chamber so that no material can drop out while the scraper floor may be set in operation as before.

The said pick-up drum and the said conveyor elements describe outer circular or curved trajectories, respectively, which are in a trailing position with respect to the center of said conveyer drum and contact one another completely or approximately.

While I have herein described what may be considered a typical and particularly useful embodiment of my said invention, I wish it to be understood that I do not limit myself to the particular details and dimensions described or illustrated; for obvious modifications will occur to a person skilled in the art.

What I claim as my invention and desire to secure by Letters Patent is:

1. An agricultural loading and transporting appliance comprising in combination: a vehicle chassis, a superstructure mounted upon said chassis to form a loading chamber, partition means separating a space forming a secondary chamber at the forward lower end of said loading chamber, a flap pivoted at the rear upper edge of said secondary chamber and forming a cover thereof, said flap having two end positions and in the first end position contacting the forward end of said superstructure and in the other end position contacting the bottom of said loading chamber, a pick-up drum and a conveyor duct arranged below said loading chamber, said pick-up drum being pivotally mounted on said chassis and said conveyor duct leading from said pick-up drum into said loading chamber from below, and conveyor elements engaging into said conveyor duct.

2. A mobile machine for the loading, compacting and transporting of agricultural bulk material comprising a substantially enclosed load chamber provided with side walls and a load-carrying platform, a rotatable pick-up drum mounted beneath said platform, a conveyor duct extending between said pick-up drum and said platform beneath said load chamber, and conveyor means engaging into said conveyor duct provided on a conveyor drum mounted adjacent said duct and rotatable in opposite direction to said pick-up drum, wherein said pick-up drum and conveyor duct are positioned immediately below the said load chamber.

3. A machine according to claim 2, comprising a scraper floor mounted on said platform.

4. A machine according to claim 2 wherein said conveyor duct terminates at its upper end at the level of said platform.

5. A mobile machine for the loading, compacting, and transporting of agricultural bulk material comprising a load chamber provided with side walls and a load-carrying platform provided with a scraper floor, a rotatable pick-up drum mounted beneath said platform, a conveyor duct extending between said pick-up drum and said platform beneath said load chamber and terminates substantially at the level of said platform, and conveyor means engaging into said conveyor duct provided on a conveyor drum mounted adjacent said duct and rotatable in opposite direction to said pick-up drum, said pick-up drum and conveyor duct being positioned immediately below the said load chamber.

6. A machine according to claim 5 wherein the pick-up drum is trailing relative to the conveyor drum and wherein the pick-up drum is pivotable rearwardly about the axis of said conveyor drum.

7. A vehicle for the loading, compacting and transporting of agricultural bulk material comprising a chassis, a load chamber on said chassis provided with side walls and a load-carrying platform, a pick-up drum journalled in bearing means mounted beneath said platform, a conveyor duct extending between said pick-up drum and said platform beneath said load chamber, substantially at the level of said platform, and conveyor elements engaging into said conveyor duct provided on a conveyor drum mounted adjacent said duct and rotatable in opposite direction to said pick-up drum, wherein the pick-up drum is trailing relative to the conveyor drum and is pivotable rearwardly about the axis of said conveyor drum, said axis being journalled below the upper edge of said chassis, said conveyor duct being arcuately disposed about said conveyor drum and composed of several sections telescoped into one another, one of said sections being fixed to said chassis and another of said sections being fixed to said bearing means.

8. A vehicle according to claim 7, comprising a compensating sheet between said sections arranged on the outside of the conveyor duct and projecting into a pocket thereof.

9. A vehicle according to claim 7 comprising a scraper floor mounted on said platform.

10. A vehicle according to claim 7 wherein the drive for said conveyor drum is effected by means of a drive chain, which is also engaged by a pinion serving as a chain-tensioner wheel, said pinion being fixed to one end of an articulated shaft carrying at its other end an adjustable intermediate disc which through a V-belt drives said pick-up drum.

11. A vehicle according to claim 10, wherein the said intermediate disc is journalled in one of the bearing shields of said pick-up drum.

12. A vehicle according to claim 7 wherein supporting wheels for the guidance of the said pick-up drum on the soil are arranged to be adjustable in height on pivotally mounted outriggers.

13. An agricultural loading and transporting appliance comprising in combination; a vehicle chassis, a superstructure mounted upon said chassis and having side walls and a load-carrying platform, a pick-up drum mounted beneath said platform, a conveyor duct mounted below said load-carrying platform so as to be directed into said superstructure and terminated substantially at the level of said platform, and conveyor means engaging into said conveyor duct provided on a conveyor drum journalled to said chassis, a separate chamber for the accommodation of the said conveyor drum being provided at the forward lower end of the said superstructure, a flap being pivoted to said separate chamber as a cover thereof, said flap having one position contacting the forward wall of the superstructure and another position contacting the said load carrying platform.

14. An appliance according to claim 13 comprising a scraper floor occupying the area of said platform.

References Cited by the Examiner
UNITED STATES PATENTS

| | | | |
|---|---|---|---|
| 2,795,100 | 6/1957 | Sund | 56—364 |
| 3,084,493 | 4/1963 | Kucera | 56—24 |
| 3,112,593 | 12/1963 | Ronning | 56—27 X |

FOREIGN PATENTS 1,300,776  7/1962  France.

ANTONIO F. GUIDA, *Acting Primary Examiner.*